United States Patent
Li et al.

(10) Patent No.: US 12,066,726 B2
(45) Date of Patent: Aug. 20, 2024

(54) ARRAY SUBSTRATE AND MANUFACTURING METHOD THEREOF, AND DISPLAY DEVICE

(71) Applicant: BOE Technology Group Co., Ltd., Beijing (CN)

(72) Inventors: Haixu Li, Beijing (CN); Guangcai Yuan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 733 days.

(21) Appl. No.: 16/978,914

(22) PCT Filed: Nov. 29, 2019

(86) PCT No.: PCT/CN2019/122023
§ 371 (c)(1),
(2) Date: Sep. 8, 2020

(87) PCT Pub. No.: WO2021/102925
PCT Pub. Date: Jun. 3, 2021

(65) Prior Publication Data
US 2023/0152639 A1    May 18, 2023

(51) Int. Cl.
*G02F 1/1347* (2006.01)
*C09D 1/00* (2006.01)
(Continued)

(52) U.S. Cl.
CPC ............ *G02F 1/1347* (2013.01); *C09D 1/00* (2013.01); *C09D 5/002* (2013.01); *C09D 163/00* (2013.01);
(Continued)

(58) Field of Classification Search
CPC ............ G02F 1/1347; G02F 1/133548; G02F 1/133536; G02F 1/1368; G02F 2201/50;
(Continued)

(56) References Cited

U.S. PATENT DOCUMENTS 10,261,359 B1    4/2019 Lee et al.
2001/0043175 A1*  11/2001 Yasukawa .......... G02F 1/133512
                                                 257/E27.111
(Continued)

FOREIGN PATENT DOCUMENTS

CN    105929593 A    9/2016
CN    106932952 A *  7/2017
(Continued)

*Primary Examiner* — Hoan C Nguyen
(74) *Attorney, Agent, or Firm* — Banner & Witcoff, Ltd.

(57) ABSTRACT

An array substrate and a manufacturing method thereof and a display device are provided. The array substrate includes a base substrate, a polarizer, a plurality of active elements, a first organic protective layer and a first inorganic protective layer. The polarizer is located on a first side of the base substrate; the plurality of active elements are arranged in an array form and provided on a second side of the base substrate opposite to the first side; the first organic protective layer is located on a side of the polarizer facing away from the base substrate and covers the polarizer; and the first inorganic protective layer is located on a side of the first organic protective layer facing away from the polarizer and covers the first organic protective layer.

16 Claims, 7 Drawing Sheets

(51) Int. Cl.
    *C09D 5/00* (2006.01)
    *C09D 163/00* (2006.01)
    *C09D 179/08* (2006.01)
    *G02F 1/1335* (2006.01)
    *G02F 1/1368* (2006.01)

(52) U.S. Cl.
    CPC ..... *C09D 179/08* (2013.01); *G02F 1/133536* (2013.01); *G02F 1/133548* (2021.01); *G02F 1/1368* (2013.01); *G02F 2201/50* (2013.01); *G02F 2202/022* (2013.01)

(58) Field of Classification Search
    CPC ..... G02F 2202/022; C09D 1/00; C09D 5/002; C09D 163/00; C09D 179/08
    See application file for complete search history.

(56) References Cited

U.S. PATENT DOCUMENTS

| | | | |
|---|---|---|---|
| 2006/0087602 A1* | 4/2006 | Kunisada | G02B 5/3041 359/485.05 |
| 2013/0342794 A1* | 12/2013 | Okada | G02F 1/133528 359/485.05 |
| 2014/0077187 A1* | 3/2014 | Lee | H10K 50/865 438/26 |
| 2014/0349425 A1 | 11/2014 | Lee et al. | |
| 2017/0066239 A1* | 3/2017 | Hirai | B41J 2/1646 |
| 2018/0196308 A1 | 7/2018 | Xu et al. | |
| 2018/0299726 A1* | 10/2018 | Oka | G02F 1/133528 |
| 2018/0341147 A1* | 11/2018 | Sugitani | G02F 1/133617 |
| 2019/0187350 A1 | 6/2019 | Yoshikawa | |
| 2019/0331940 A1 | 10/2019 | Poole et al. | |

FOREIGN PATENT DOCUMENTS

| | | | | |
|---|---|---|---|---|
| CN | 108535904 A | | 9/2018 | |
| CN | 110262109 A | | 9/2019 | |
| CN | 110398865 A | | 11/2019 | |
| CN | 110413144 A | | 11/2019 | |
| JP | 3179503 B2 | * | 6/2001 | |
| KR | 20170025545 A | * | 3/2017 | |
| WO | WO-2012111168 A1 | * | 8/2012 | ............. G02B 3/005 |

* cited by examiner image displayed by local dimming technology brightness of a plurality of backlight blocks Backlight

ARRAY SUBSTRATE AND MANUFACTURING METHOD THEREOF, AND DISPLAY DEVICE

This application is a U.S. National Phase Entry of International Application No. PCT/CN2019/122023 filed on Nov. 29, 2019, designating the United States of America. The present application claims priority to and the benefit of the above-identified application and the above-identified application is incorporated by reference herein in its entirety.

TECHNICAL FIELD

At least one embodiment of the present disclosure relates to an array substrate and a manufacturing method thereof, and a display device.

BACKGROUND

For a liquid crystal display panel, the display quality of the display panel can be improved by adopting a local dimming (LD) technology. In order to combine the local dimming technology and a backlight unit of side-lit type, a light control panel needs to be added between the liquid crystal display panel and the backlight unit of side-lit type. The light control panel controls a light transmittance of its predetermined region. For a portion of an image with a higher image brightness (gray scale), the light transmittance of the corresponding region of the light control panel is set to be high, thus allowing more light from the backlight unit to pass through the corresponding region of the light control panel. For a portion of the image with a lower image brightness, the light transmittance of the corresponding region of the light control panel is set to be low, thus allowing less light from the backlight unit to pass through the corresponding region of the light control panel, so that the purposes of improving the contrast of the image is achieved, and the display quality is enhanced.

SUMMARY

At least one embodiment of the disclosure provides an array substrate. The array substrate includes a base substrate, a polarizer, a plurality of active elements, a first organic protective layer and a first inorganic protective layer. The polarizer is located on a first side of the base substrate; the plurality of active elements are arranged in an array form and provided on a second side of the base substrate opposite to the first side; the first organic protective layer is located on a side of the polarizer facing away from the base substrate and covers the polarizer; and the first inorganic protective layer is located on a side of the first organic protective layer facing away from the polarizer and covers the first organic protective layer.

For example, the array substrate provided by at least one embodiment of the disclosure further comprises a second organic protective layer, located on a side of the first inorganic protective layer facing away from the polarizer and covering a surface of the first inorganic protective layer facing away from the polarizer, in which a roughness of a surface of the second organic protective layer facing away from the polarizer is greater than a roughness of the surface of the first inorganic protective layer facing away from the polarizer.

For example, in the array substrate provided by at least one embodiment of the disclosure, a material of the first organic protective layer is a first resin material, and a material of the second organic protective layer is a second resin material; an elastic modulus of the first resin material is smaller than an elastic modulus of the second resin material, and the roughness of the surface of the second organic protective layer facing away from the polarizer is greater than a roughness of a surface of the first organic protective layer facing away from the polarizer.

For example, in the array substrate provided by at least one embodiment of the disclosure, a material of the first organic protective layer is polyimide, and a material of the second organic protective layer is acrylic or epoxy resin.

For example, in the array substrate provided by at least one embodiment of the disclosure, a thickness of the first organic protective layer in a direction perpendicular to the base substrate is greater than a thickness of the second organic protective layer in a direction perpendicular to the base substrate.

For example, in the array substrate provided by at least one embodiment of the disclosure, the thickness of the first organic protective layer in the direction perpendicular to the base substrate is 3 to 5 times of the thickness of the second organic protective layer in the direction perpendicular to the base substrate.

For example, the array substrate according to at least one embodiment of the disclosure further comprises: a second inorganic protective layer, located on a side of the first organic protective layer close to the polarizer and in contact with the polarizer, in which a water absorption rate of the first inorganic protective layer is smaller than or equal to a water absorption rate of the second inorganic protective layer.

For example, in the array substrate provided by at least one embodiment of the disclosure, a material of the first inorganic protective layer is silicon nitride, and a material of the second inorganic protective layer comprises one or more selected from the group consisting of silicon oxide, silicon nitride, and silicon oxynitride.

For example, in the array substrate provided by at least one embodiment of the disclosure, the polarizer is a reflective polarizer.

For example, in the array substrate provided by at least one embodiment of the disclosure, the reflective polarizer is a wire-grid polarizer (WGP).

At least on embodiment of the disclosure provides a display device, and the display device comprises any one of the array substrates as described above.

For example, the display device provided by at least one embodiment of the disclosure further comprises: a liquid crystal display panel and a light control panel which are stacked, a first polarizer, a second polarizer and a third polarizer. The liquid crystal display panel comprises a display liquid crystal layer, and the light control panel comprises a light control liquid crystal layer; the first polarizer is located between the display liquid crystal layer and the light control liquid crystal layer; the light control liquid crystal layer is located between the first polarizer and the second polarizer; the first polarizer is located between the second polarizer and the third polarizer, and the display liquid crystal layer is located between the first polarizer and the third polarizer; the first polarizer, the second polarizer, and the third polarizer are configured so that a backlight sequentially passes through the second polarizer, the first polarizer, and the third polarizer; and the polarizer of the array substrate serves as at least one of the first polarizer and the second polarizer.

For example, in the display device provided by at least one embodiment of the disclosure, the liquid crystal display panel comprises a first substrate and a second substrate which are opposite to each other, and the display liquid crystal layer is located between the first substrate and the second substrate; the light control panel comprises a third substrate and a fourth substrate which are opposite to each other, the light control liquid crystal layer is located between the third substrate and the fourth substrate, and the second substrate and the third substrate are located between the first substrate and the fourth substrate; and the second substrate is the array substrate, and the polarizer of the array substrate is the first polarizer and is located on a side of a base substrate of the second substrate facing away from the display liquid crystal layer; or the third substrate is the array substrate, and the polarizer of the array substrate is the first polarizer and is located on a side of a base substrate of the third substrate close to the display liquid crystal layer.

For example, the display device provided by at least one embodiment of the disclosure comprises a first substrate, a second substrate and a common substrate. The second substrate is opposite to the first substrate; the common substrate is located between the first substrate and the second substrate; the liquid crystal display panel and the light control panel share the common substrate, the liquid crystal display panel comprises the first substrate and the common substrate, and the display liquid crystal layer is located between the first substrate and the common substrate; the light control panel comprises the second substrate and the common substrate, and the light control liquid crystal layer is located between the second substrate and the common substrate; and the common substrate is the array substrate, and the polarizer of the array substrate is the first polarizer and is located on a side of a base substrate of the common substrate facing away from the display liquid crystal layer.

For example, in the display device provided by at least one embodiment of the disclosure, the fourth substrate is the array substrate, and the polarizer of the array substrate is the second polarizer and is located on a side of a base substrate of the fourth substrate facing away from the light control liquid crystal layer.

For example, in the display device provided by at least one embodiment of the disclosure, the second substrate is the array substrate, and the polarizer of the array substrate is the second polarizer and is located on a side of a base substrate of the second substrate facing away from the light control liquid crystal layer.

At least one embodiment of the disclosure provides a manufacturing method of an array substrate, and the method comprises: providing a base substrate; forming a polarizer on a first side of the base substrate; forming a first organic protective layer on a side of the polarizer facing away from the base substrate, in which the first organic protective layer covers the polarizer; forming a first inorganic protective layer, in which the first inorganic protective layer is located on a side of the first organic protective layer facing away from the polarizer and covers the first organic protective layer; and after forming the polarizer, the first organic protective layer and the first inorganic protective layer, forming a plurality of active elements arranged in an array form on a second side of the base substrate opposite to the first side.

For example, the manufacturing method provided by at least on embodiment of the disclosure further comprises: before forming the first organic protective layer, forming a second inorganic protective layer, in which the second inorganic protective layer is located on a side of the first organic protective layer close to the polarizer and in contact with the polarizer, and a water absorption rate of the first inorganic protective layer is smaller than or equal to a water absorption rate of the second inorganic protective layer.

For example, in the manufacturing method provided by at least on embodiment of the disclosure, a material of the first inorganic protective layer is silicon nitride, and a material of the second inorganic protective layer comprises one or more selected from the group consisting of silicon oxide, silicon nitride or silicon oxynitride.

For example, the manufacturing method provided by at least on embodiment of the disclosure further comprises: forming a second organic protective layer on a side of the first inorganic protective layer facing away from the base substrate, in which a roughness of a surface of the second organic protective layer facing away from the polarizer is greater than a roughness of a surface of the first inorganic protective layer facing away from the polarizer.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
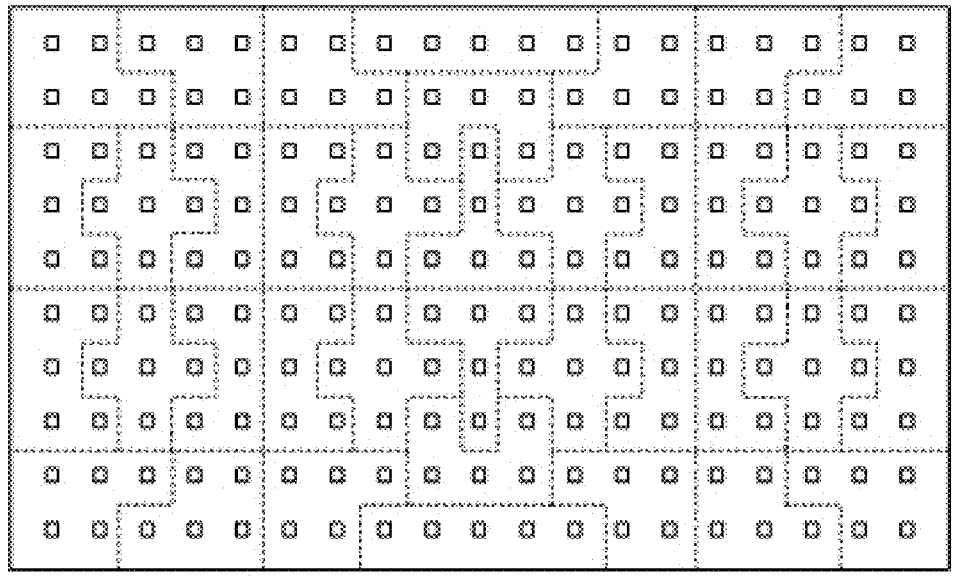
FIG. 1A and FIG. 1B show schematic diagrams of local dimming technology.

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Similarly, the terms "comprise," "comprising," "include," "including," etc., are intended to specify that the elements or the objects stated before these terms encompass the elements or the objects and equivalents thereof listed after these terms, but do not preclude the other elements or objects. Expressions such as "in," "out," "on," "under" and the like are only used to indicate relative position relationship, and when the position of the described object is changed, the relative position relationship may be changed accordingly.

The drawings in the present disclosure are not strictly drawn according to actual scale. The total number of color sub-pixels in the display panel is not limited to the number as shown in the drawings, and the specific size of each structure can be determined according to actual requirements. The drawings described in the present disclosure are only schematic structural diagrams.

The local dimming technology divides the whole backlight unit into a plurality of backlight blocks each of which is independently drivable, and each of the plurality of backlight blocks includes one or more light emitting diodes (LEDs). According to the gray scales to be displayed in different portions of the display image, the driving current of the LEDs in each of the plurality of backlight blocks respectively corresponding to the different portions of the display image is automatically adjusted to implement that the brightness of each of the plurality of backlight blocks of the backlight unit is independently adjusted, so that the contrast of the display image is improved. For example, with respect to an exemplary direct-lit type backlight unit, the schematic diagram of the division of the LED light sources of the whole backlight unit is shown in FIG. 1A, in which a small square represents an LED, and a plurality of regions separated by dashed lines represent the plurality of backlight blocks. Each of the plurality of backlight blocks includes one or more LEDs and is controlled independently from other backlight blocks. For example, the LEDs in each of the plurality of backlight blocks are linked, that is, a consistent current passes through each of the LEDs located in the same backlight block.

Figure 1B:
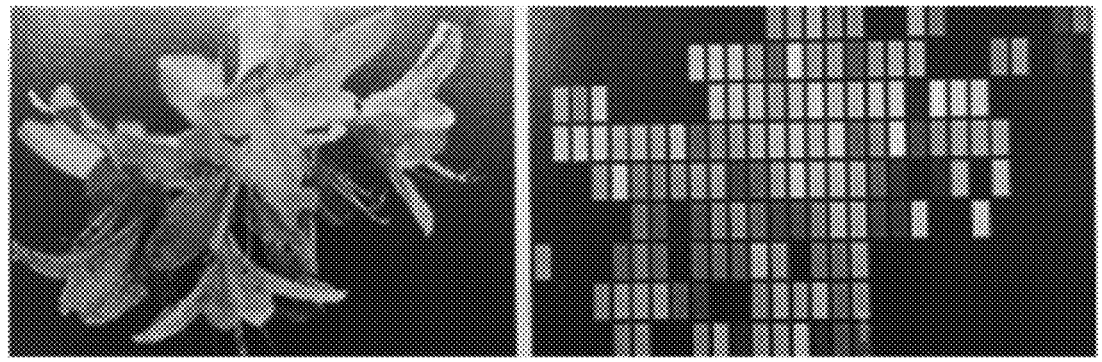

The local dimming technology, according to the gray scale of the image content displayed by the liquid crystal display panel, adjusts the brightness of the corresponding backlight block. FIG. 1B shows schematic diagrams of the display image and the brightness of the backlight blocks after the local dimming is performed. As shown in FIG. 1B, the backlight unit includes a plurality of backlight blocks arranged in an array, each of the plurality of backlight blocks has a rectangular shape, and the local dimming technology adjusts the brightness of the backlight blocks according to the gray scale of the image content displayed by the liquid crystal display panel. For the portion of the image with a higher brightness (gray scale), the brightness of the corresponding backlight blocks is set to be high; for the portion of the image with a lower brightness, the brightness of the corresponding backlight blocks is set to be low, so that the backlight power consumption is reduced, the contrast of the display image is improved, and the display quality is enhanced.

However, the above-mentioned local dimming technology is suitable for the direct-lit type backlight unit, and the LEDs serving as light sources for example are uniformly distributed in the whole backlight unit. In order to use the local dimming technology in the backlight unit of side-lit type, a light control panel needs to be added between the liquid crystal display panel and the backlight unit of side-lit type. The light control panel controls the light transmittance of its predetermined region. For the portion of the image with a higher image brightness (gray scale), the light transmittance of the corresponding region of the light control panel is set to be high, thus allowing more light from the backlight unit to pass through the corresponding region of the light control panel. For the portion of the image with a lower brightness, the light transmittance of the corresponding region of the light control panel is set to be low, thus allowing less light from the backlight unit to pass through the corresponding region of the light control panel, so that the purposes of improving the contrast of the display image is achieved, and the display image quality is enhanced. In addition, under the case where the direct-lit type backlight unit is adopted, the division of the backlight blocks is difficult to achieve high density (the total number of the backlight blocks per unit area) and high precision. Under the case where the division density and the division precision of the light control units are required to be high, this requirement can be realized by using the light control panel, and the manufacturing process of the light control panel is easy to realize.

In the display panel adopting the local dimming technology, the light from the backlight unit passes through the light control panel and the liquid crystal display panel in turn, and the light transmittance is usually low. Therefore, it is of great significance to improve the light transmittance of thus display panel.

At least one embodiment of the present disclosure provides an array substrate. The array substrate includes a base substrate, a polarizer, a plurality of active elements, a first organic protective layer, and a first inorganic protective layer. The polarizer is located on a first side of the base substrate. The plurality of active elements are arranged in an array form and provided on a second side of the base substrate opposite to the first side. The first organic protective layer is located on a side of the polarizer facing away from the base substrate and covering the polarizer. The first inorganic protective layer is located on a side of the first organic protective layer facing away from the polarizer and covering the first organic protective layer.

Figure 2A:
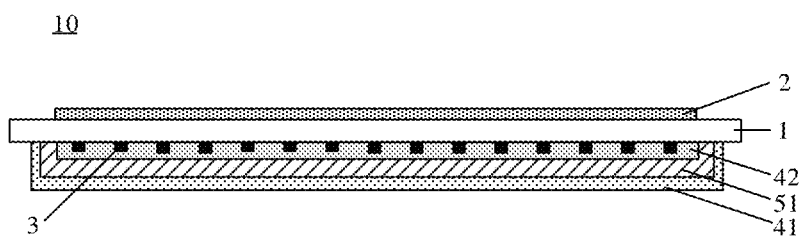
FIG. 2A is a schematic structural diagram of an array substrate provided by at least one embodiment of the present disclosure.

Exemplarily, FIG. 2A is a schematic structural diagram of the array substrate provided by at least one embodiment of the present disclosure. As shown in FIG. 2A, the array substrate 10 provided by at least one embodiment of the present disclosure includes a base substrate 1, a polarizer 3, a plurality of active elements 2, a first organic protective layer 51, and a first inorganic protective layer 41. The polarizer 3 is located on a first side of the base substrate 1. The plurality of active elements 2 are arranged in an array form and provided on a second side of the base substrate 1 opposite to the first side. For example, the array substrate 10 is a display array substrate, and the plurality of active elements 2 include thin film transistors (TFTs) and other similar elements for driving and controlling the display state of a display panel or a display device comprising the array substrate 10. For the specific structure of the plurality of active elements 2, those skilled in the art may adopt a conventional design. The first organic protective layer 51 is located on a side of the polarizer 3 facing away from the base substrate 1 and covers the polarizer 3. The first inorganic protective layer 41 is located on a side of the first organic protective layer 51 facing away from the polarizer 3 and covers the first organic protective layer 51. Compared with inorganic materials, organic materials have better flexibility and elasticity, therefore, the first organic protective layer 51 has better flexibility and elasticity than the first inorganic protective layer 41. The first organic protective layer 51 is arranged on a side of the first inorganic protective layer close to the polarizer 3, so that the polarizer 3 is better protected by the first organic protective layer 51 with better flexibility and elasticity. For example, the polarizer 3, such as a wire-grid polarizer (WGP) described below, is firstly manufactured on the first side of the base substrate 1 and then the plurality of active elements are manufactured on the second side of the base substrate 1; in this case, the organic protective layer needs to be arranged on the surface of the WGP to protect the WGP, so that the WGP is prevent from being damaged in the manufacture process of the plurality of active elements. However, in this case, the technical problems are caused as follows: during the plurality of active elements are manufactured on the second side of the base substrate 1, the manufacture process of the plurality of active elements comprises multiple times of washing processes, and the first organic protective layer may easily fall off after absorbing water; in addition, if the first organic protective layer 51 absorbs water, more water vapor is generated during the plurality of active elements 2 are manufactured on the second side of the array substrate 10 in a vacuum environment, which affects the quality of the plurality of active elements 2 and damages the equipment for manufacturing the active elements 2. Compared with organic materials, inorganic materials have better water resistance, therefore, the first inorganic protective layer 41 has better water resistance than the first organic protective layer 51. The first inorganic protective layer 41 is located on the side of the first organic protective layer 51 facing away from the polarizer 3 and covers the first organic protective layer 51, which prevents the first organic protective layer 51 and the polarizer 3 from absorbing water, thus avoiding the above-described technical problems.

For example, a thickness of the first inorganic protective layer 41 in a direction perpendicular to the base substrate 1 is 2000 angstroms –5000 angstroms to form a dense protective layer, so as to better prevent external water vapor from entering the first organic protective layer 51 and the polarizer 3. If the thickness of the first inorganic protective layer 41 is too small, the effect of blocking water vapor by the first inorganic protective layer 41 is reduced. The thickness of the first inorganic protective layer 41 is 2000 angstroms –5000 angstroms, which obtains a better effect of blocking water vapor without causing the thickness of the array substrate 10 too large.

For example, a material of the first organic protective layer 51 is polyimide, and the polyimide has good elasticity and is easy for obtaining the required thickness. For example, a thickness of the first organic protective layer 51 in the direction perpendicular to the base substrate 1 is 5 μm-10 μm, which plays a better buffer role of protecting the polarizer 3 without significantly increasing the thickness of the array substrate 10, so that the thickness of the device, such as the display panel, comprising the array substrate 10 is not too large. If the thickness of the first organic protective layer 51 is too small, it is unfavorable to obtain a good buffer effect to protect the polarizer 3; and if the thickness of the first organic protective layer 51 is too large, it is unfavorable to obtain a thin array substrate 10.

For example, as shown in FIG. 2A, the array substrate 10 further includes a second inorganic protective layer 42. The second inorganic protective layer 42 is located on a side of the first organic protective layer 41 close to the polarizer 3 and in contact with the polarizer 3. The water absorption rate of the first inorganic protective layer 41 is smaller than or equal to the water absorption rate of the second inorganic protective layer 42, so that the first inorganic protective layer 41 located outside plays a good waterproof role. In addition, for example, the polarizer 3 is a reflective polarizer, and further the reflective polarizer is a wire-grid polarizer (WGP), such as a metal wire-grid polarizer (WGP), which includes a plurality of strips, and adjacent two of the plurality of strips are spaced from each other by a gap. For example, a deposition method is used to form the second inorganic layer 42, and the environment in which the second inorganic layer 42 is formed by the deposition method is close to a vacuum environment; in this case, the gaps between the plurality of strips that are not filled with the inorganic layer 42 are almost vacuum so that the gaps of the WGP will not be filled with air, thus preventing the deformation of the polarizer 3 caused by the expansion of air in the gaps at high temperature in the subsequent manufacturing steps. As a contrast, if the layer in contact with the WGP is an organic layer, the organic layer is formed by a coating method and the manufacturing process of forming the organic layer by the coating method is performed in the atmospheric environment, the gaps of the WGP are filled with air, and the air in the gaps expand in the high temperature environment in the subsequent manufacturing steps, thereby resulting in the deformation of the polarizer 3.

It should be noted that the above mentioned water absorption rate refers to the ability of a material to absorb water under standard atmospheric pressure. For example. The water absorption rate is measured by the mass of water absorbed by the material and is expressed as a percentage.

For example, the material of the first inorganic protective layer 41 is silicon nitride. Compared with other inorganic materials used in the array substrate such as the array substrate applied in the display field, silicon nitride is easy to be manufactured and has lower water absorption rate, which is lower than the water absorption rate of other inorganic materials such as silicon oxide and silicon oxynitride, etc. In addition, in the case that the material of the first inorganic layer 41 is silicon nitride, the adhesion between the first inorganic layer 41 and the first organic layer 51 is improved, and separation or warpage between the first inorganic layer 41 and the first organic layer 51 are reduced or prevented. The material of the second inorganic protective layer 42 includes one or more selected from the group consisting of silicon oxide, silicon nitride, and silicon oxynitride. For example, the material of the second inorganic protective layer 42 is preferably silicon oxide, and silicon oxide is easy to be formed and better fills the gaps of the wire-grid polarizer 3. Of course, the material of the first inorganic protective layer 41 and the material of the second inorganic protective layer 42 are not limited to those listed above.

For example, under the case where the polarizer is the metal wire-grid polarizer (WGP), the material of the wire-grid polarizer is white metal to improve the reflectivity of the polarizer. The reflectivity of the polarizer is used to improve the light transmittance of the display device comprising the array substrate 10. The white metal is, for example, aluminum, and aluminum not only has high reflectivity but also has stable properties, low hardness, and good ductility, and is easy to be used to manufacture the wire-grid polarizer.

Figure 2B:
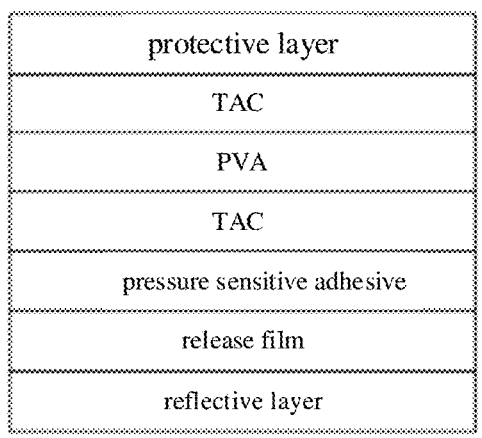
FIG. 2B is a schematic diagram of a reflective polarizer in at least one embodiment of the present disclosure.

For example, in some embodiments, the reflective polarizer in the embodiments of the present disclosure is not the wire-grid polarizer, for example, the reflective polarizer is a reflective polarizer of sheet form. For example, as shown in FIG. 2B, the reflective polarizer of sheet form includes a polyvinyl alcohol (PVA) film, a triacethyl cellulose (TAC) protective film, a pressure sensitive adhesive, a release film, and a reflective layer located on a side of the release film facing away from the PVA film. The reflective polarizer of sheet form also improves the light transmittance of the display device comprising the array substrate 10 to a certain extent; however, compared with the reflective polarizer of sheet form, the reflective polarizer of WGP is more helpful for obtaining high light transmittance of the display device.

Figure 2C:
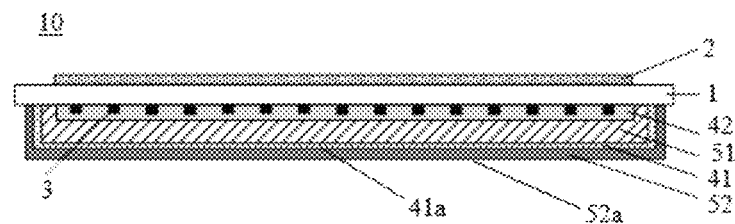
FIG. 2C is another schematic structural diagram of the array substrate provided by at least one embodiment of the present disclosure, and FIG. 2C-1 schematically shows the roughness of the surface of the second organic protective layer facing away from the polarizer and the roughness of the surface of the first inorganic protective layer facing away from the polarizer of the array substrate as shown in FIG. 2C provided by at least one embodiment of the present disclosure.
Figures 1, 2C:
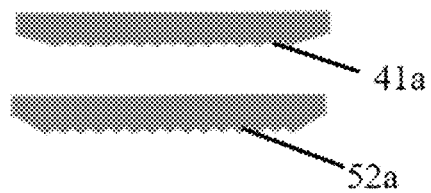

For example, FIG. 2C is another schematic structural diagram of the array substrate provided by at least one embodiment of the present disclosure. The array substrate 10 as shown in FIG. 2C has the following differences from the array substrate as shown in FIG. 2A. As shown in FIG. 2C, the array substrate 10 further includes a second organic protective layer 52. The second organic protective layer 52 is located on a side of the first inorganic protective layer 41 facing away from the polarizer 3, and the roughness of the surface 52a of the second organic protective layer 52 facing away from the polarizer 3 is greater than the roughness of the surface 41a of the first inorganic protective layer 41 facing away from the polarizer 3 as schematically shown in FIG. 2C-1. Roughness in the present disclosure refers to the unevenness caused by tiny peaks and valleys on the surface, which is a distance between two peaks or two valleys on the surface. In the present embodiment, the roughness refers to the distance between two peaks or two valleys on the surface. For example, the plurality of active elements such as TFTs are manufactured by a deposition method in a deposition equipment; in this deposition process, the base substrate 1 provided with the polarizer 3, the first organic protective layer 51, the first inorganic protective layer 41, and the second organic protective layer 52 is grasped and fixed by a grasping device (such as a friction manipulator) provided in the deposition equipment, and the grasping device is in contact with the surface 52a of the second organic protective layer 52 facing away from the polarizer 3. The surface 52a of the second organic protective layer 52 facing away from the polarizer 3 has higher roughness, which is beneficial to increase the static friction coefficient of the surface 52a of the second organic protective layer 52 facing away from the polarizer 3, thereby increasing the static friction between the surface 52a of the second organic protective layer 52 facing away from the polarizer 3 and the grasping device, preventing the base substrate from falling off, and improving the yield and production efficiency.

For example, the material of the first organic protective layer 51 is a first resin material, and the material of the second organic protective layer 52 is a second resin material. The elastic modulus of the first resin material is smaller than the elastic modulus of the second resin material, so that the first organic protective layer 51 closer to the polarizer 3 has a relatively greater elasticity, which plays a better buffer role to better protect the polarizer 3. Furthermore, the roughness of the surface of the second organic protective layer 52 facing away from the polarizer 3 is greater than the roughness of the surface of the first organic protective layer 51 facing away from the polarizer 3, that is, in the direction perpendicular to the base substrate 1, the second organic protective layer 52 is farthest from the polarizer 3, and the roughness of the surface of the second organic protective layer 52 facing away from the polarizer 3 is maximum, so as to prevent the base substrate from falling off from the grasping device in the above mentioned deposition equipment.

For example, the material of the second organic protective layer 52 is acrylic or epoxy resin. After testing, it is concluded that, due to the properties of these materials themselves, the friction between the surface of the layer formed with these materials by a coating method and other objects such as the grasping device is larger compared with the case that the second organic protective layer 52 is formed by other materials, which is beneficial to prevent the base substrate from falling off from the grasping device in the above mentioned deposition equipment.

For example, the thickness of the first organic protective layer 51 in the direction perpendicular to the base substrate 1 is greater than the thickness of the second organic protective layer 52 in the direction perpendicular to the base substrate 1. For example, the thickness of the first organic protective layer 51 in the direction perpendicular to the base substrate 1 is 3 to 5 times of the thickness of the second organic protective layer 52 in the direction perpendicular to the base substrate 1. For example, the thickness of the first organic protective layer 51 in the direction perpendicular to the base substrate 1 is 5 μm-10 μm, and the thickness of the second organic protective layer 52 in the direction perpendicular to the base substrate 1 is 1.5 μm-2 μm. In this way, the first organic protective layer 51 has a better buffer effect, and the thickness of the second organic protective layer 52 is not too large so that the thickness of the array substrate 10 is not too large.

Other features and technical effects of the array substrate as shown in FIG. 2C are the same as the corresponding features and the technical effects of the array substrate in FIG. 2A, and please refer to the previous description.

Figure 2D:
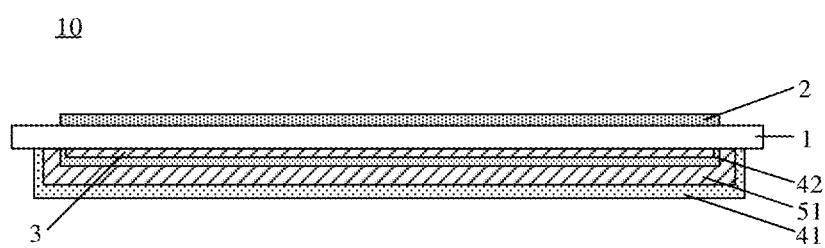
FIG. 2D is still another schematic structural diagram of the array substrate provided by at least one embodiment of the present disclosure.

FIG. 2D is still another schematic structural diagram of the array substrate provided by at least one embodiment of the present disclosure. The array substrate 10 as shown in FIG. 2D has the following differences from the array substrate as shown in FIG. 2A. As shown in FIG. 2D, the polarizer 3 of the array substrate 10 is a transmissive polarizer. For example, the polarizer 3 has an integral structure in a sheet form instead of a wire-grid structure and the polarizer 3 includes organic material. For example, the polarizer 3 is an iodine polarizer or a dye polarizer. The light transmittance of the transmissive polarizer is relatively high, especially the iodine polarizer is easy to obtain relatively high light transmittance, so that in the display device comprising the array substrate 10, the light transmittance of the display device is significantly improved by using the transmissive polarizer with high light transmittance.

Figure 2E:
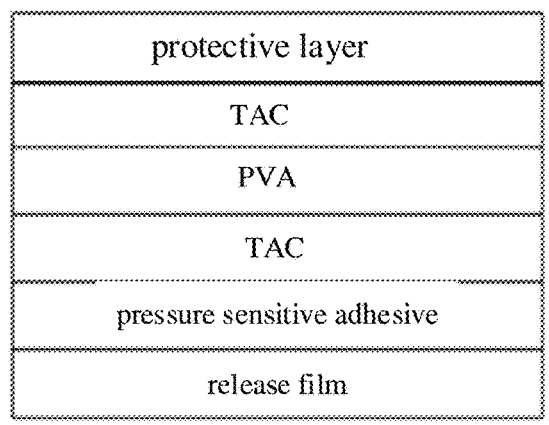
FIG. 2E is a schematic diagram of a transmissive polarizer in at least one embodiment of the present disclosure.

As shown in FIG. 2E, under the case where the polarizer 3 is the transmissive polarizer, for example, the polarizer 3 includes a polyvinyl alcohol (PVA) film configured to generate polarized light. For example, the polyvinyl alcohol (PVA) film includes a dichroic dye iodine, and a triacethyl cellulose (TAC) protective film is respectively located on two sides of the PVA film. For example, the polarizer 3 further includes a pressure sensitive adhesive located on a side of one of the triacethyl cellulose (TAC) protective films facing away from the polyvinyl alcohol (PVA) film, a release film covering the pressure sensitive adhesive and in contact with the pressure sensitive adhesive, and a protective layer located on a side of the other of the triacethyl cellulose (TAC) protective films facing away from the polyvinyl alcohol (PVA) film.

Other features and technical effects of the array substrate as shown in FIG. 2D are the same as the corresponding features and the technical effects of the array substrate in FIG. 2C, and please refer to the previous description.

At least one embodiment of the present disclosure further provides a display device, and the display device includes any array substrate provided by the embodiments of the present disclosure. The display device is any device with display function, such as, a display device that needs to use the polarizer for adjusting light; for example, the display device is a liquid crystal display device.

For example, the display device includes a liquid crystal display panel and a light control panel which are stacked, a first polarizer, a second polarizer, and a third polarizer. The liquid crystal display panel includes a display liquid crystal layer, and the light control panel includes a light control liquid crystal layer. The first polarizer is located between the display liquid crystal layer and the light control liquid crystal layer. The light control liquid crystal layer is located between the first polarizer and the second polarizer. The first polarizer is located between the second polarizer and the third polarizer, and the display liquid crystal layer is located between the first polarizer and the third polarizer. The first polarizer, the second polarizer, and the third polarizer are configured so that a backlight sequentially passes through the second polarizer, the first polarizer, and the third polarizer. The polarizer of the array substrate as described above serves as at least one of the first polarizer and the second polarizer.

Figure 3A:
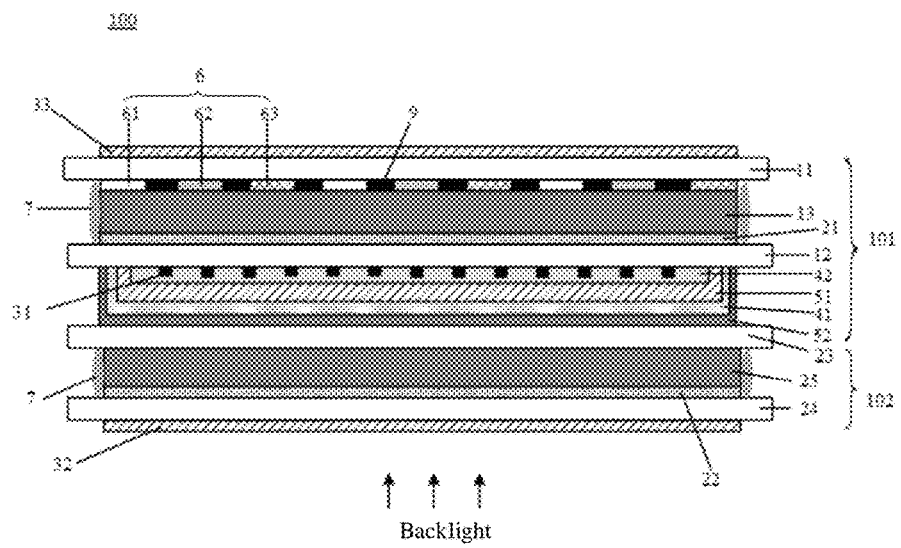
FIG. 3A is a schematic structural diagram of a display device provided by at least one embodiment of the present disclosure.

Exemplarily, FIG. 3A is a schematic structural diagram of the display device provided by at least one embodiment of the present disclosure. As shown in FIG. 3A, the display device 100 includes a liquid crystal display panel 101 and a light control panel 102 which are stacked, a first polarizer 31, a second polarizer 32, and a third polarizer 33. The liquid crystal display panel 1 includes a first substrate (including a base substrate 11) and a second substrate (including a base substrate 12) opposite to each other, and a display liquid crystal layer 13 located between the first substrate and the second substrate. The light control panel 102 includes a third substrate (including a base substrate 23) and a fourth substrate (including a base substrate 24) opposite to each other, and a light control liquid crystal layer 25 located between the third substrate and the fourth substrate. The second substrate and the third substrate are located between the first substrate and the fourth substrate. The light control liquid crystal layer 23 is located between the first polarizer 31 and the second polarizer 32. The first polarizer 31 is located between the second polarizer 32 and the third polarizer 33, and the display liquid crystal layer 13 is located between the first polarizer 31 and the third polarizer 33. The first polarizer 31, the second polarizer 32, and the third polarizer 33 are configured such that a backlight sequentially passes through the second polarizer 32, the first polarizer 31, and the third polarizer 33. The backlight refers to the light from a backlight source. The polarization direction of the first polarizer 31 is perpendicular to the polarization direction of the second polarizer 32. The polarization direction of the third polarizer 33 is perpendicular to the polarization direction of the second polarizer 32. Therefore, the liquid crystal display panel 101 is configured to realize the display function, and the light control panel 102 is configured to control the direction or intensity of the backlight incident on the liquid crystal display panel 101 according to requirements, for example, to realize the conversion between a narrow viewing angle and a wide viewing angle, or to realize different brightnesses at various positions of the display panel, etc. For example, the backlight comes from a direct-lit type backlight source or a side-lit backlight source. For example, the second substrate is the array substrate 10 provided by at least one embodiment of the present disclosure; for example, the second substrate is the array substrate 10 as shown in FIG. 2C. The polarizer of the array substrate 10 serves as the first polarizer 31 and is located on the side of the base substrate 12 of the second substrate facing away from the display liquid crystal layer 13. For example, the first polarizer 31 is the reflective polarizer, such as the WGP. For example, the reflective polarizer is made of metal material, the first polarizer 31 is located on the side of the base substrate 12 of the second substrate facing away from the display liquid crystal layer 13, so as to prevent an interference electric field from being generated between the first polarizer 31 made of metal material and the display active elements 21, thereby preventing the interference electric field from affecting the display effect. In addition, in the process of bonding the second substrate with the first substrate, the first polarizer 31 has to withstand high temperature; by forming first polarizer 31 with the metal material, it is avoided the problem that the polarizer made of organic material cannot withstand high temperature and the polarizer is damaged.

As shown in FIG. 3A, for example, the first substrate is a color film substrate. For example, a side of the base substrate 11 of the first substrate close to the second substrate is provided with a color filter layer and a black matrix 9, the color filter layer comprises a plurality of pixel patterns 6 arranged in an array, and the black matrix 9 defines the plurality of pixel patterns 6. Each of the plurality of pixel patterns 6 includes a plurality of color sub-pixel patterns with different colors, for example, each of the plurality of pixel patterns 6 includes a first color sub-pixel pattern 61, a second color sub-pixel pattern 62, and a third color sub-pixel pattern 63. The backlight from the backlight source enters into the liquid crystal display panel 101 after passing through the light control panel 102, and then is emitted after passing through the color filter layer. The second substrate is a display array substrate, and a display array layer is arranged on a side of the base substrate 12 of the second substrate close to the first substrate. The display array layer includes for example a pixel drive circuit, and the pixel drive circuit for example includes a plurality of active elements 21, such as thin film transistors (TFT) and other elements, for driving and controlling the display state of the liquid crystal display panel 101. For the specific structure of the plurality of active elements 21, those skilled in the art may adopt a conventional design.

For example, the fourth substrate is a light control array substrate, a plurality of light control active elements 22 are arranged on a first side of the base substrate 24 of the fourth substrate close to the liquid crystal display panel 101, and the second polarizer 32 is located on a second side of the base substrate 24 of the fourth substrate facing away from the third substrate 23. The light control panel 102 includes a plurality of light control units arranged in an array, and the light dimming state of each of the plurality of light control units is controlled independently. For example, the plurality of light control active elements 22 include thin film transistors (TFTs) and other elements for driving and controlling the light dimming state of the plurality of light control units.

For the specific structure of the plurality of light control active elements 22, those skilled in the art may adopt a conventional design.

For example, each of the second polarizer 32 and the third polarizer 33 is an integral sheet structure instead of a wire-grid structure, and includes an organic material. Because the light transmittance of the iodine polarizer is relatively high, for example, each of the second polarizer 32 and the third polarizer 33 is the iodine polarizer. For example, in other embodiments, the third polarizer 33 is a dye polarizer. The embodiments of the present disclosure do not limit the specific structure of the polarizer with the integral sheet structure.

For example, as shown in FIG. 3A, the display device 100 further includes an adhesive 7 configured to bond the base substrate 11 of the first substrate with the base substrate 12 of the second substrate, and to bond the base substrate 23 of the third substrate with the base substrate 24 of the fourth substrate so as to form the liquid crystal display panel 101 and the light control panel 102.

For example, the base substrate 11 of the first substrate, the base substrate 12 of the second substrate, the base substrate 23 of the third substrate and the base substrate 24 of the fourth substrate are glass substrates, quartz substrates, etc. For example, the base substrate 11 of the first substrate, the base substrate 12 of the second substrate, the base substrate 23 of the third substrate and the base substrate 24 of the fourth substrate are flexible substrates such as polyimide substrates for manufacturing flexible display panels.

Figure 3B:
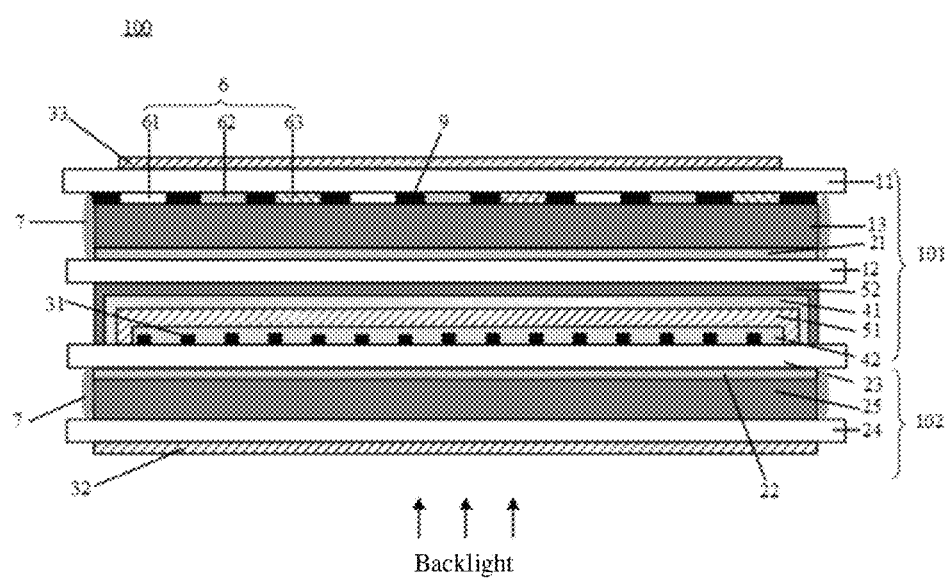
FIG. 3B is another schematic structural diagram of the display device provided by at least one embodiment of the present disclosure.

FIG. 3B is another schematic structural diagram of the display device provided by at least one embodiment of the present disclosure. In FIG. 3B, the third substrate is the array substrate 10 provided in the embodiments of the present disclosure, and the polarizer of the array substrate 10 is the first polarizer 31 that is located on a side of the base substrate 23 of the third substrate close to the display liquid crystal layer 13, so as to prevent the interference electric field from being generated between the first polarizer 31 made of metal material and the plurality of active elements 22, thereby preventing the interference electric field from affecting the display effect. For example, the first polarizer 31 is the reflective polarizer such as the WGP. The first polarizer 31 has to withstand high temperature in the process of bonding the third substrate with the fourth substrate; thus, by forming the first polarizer 31 with the metal material, it is avoided the problem that the polarizer made of the organic material cannot withstand high temperature and the polarizer is damaged.

Other features of the display device 100 as shown in FIG. 3B are the same as the corresponding features of the display device 100 in FIG. 3A, please refer to the previous description.

Figure 3C:
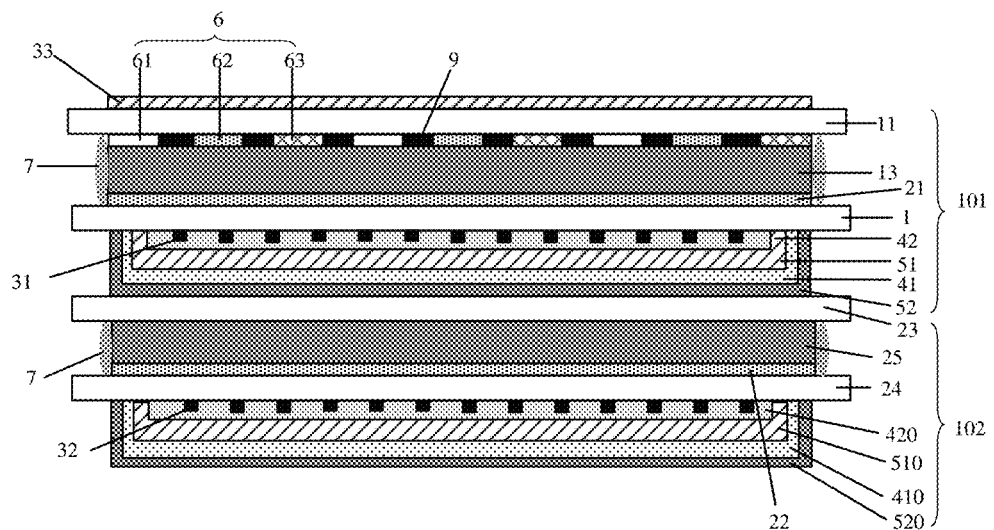
FIG. 3C is still another schematic structural diagram of the display device provided by at least one embodiment of the present disclosure.

FIG. 3C is still another schematic structural diagram of the display device provided by at least one embodiment of the present disclosure. The display device as shown in FIG. 3C has the following differences from the display device as shown in FIG. 3A. Each of the second substrate and the fourth substrate is the array substrate 10 provided by the embodiments of the present disclosure. The polarizer of the array substrate 10 is the second polarizer 32 and is located on a side of the base substrate 24 of the fourth substrate facing away from the light control liquid crystal layer 25, so as to prevent the interference electric field from being generated between the second polarizer 32 made of metal material and the plurality of active elements 22, thereby preventing the interference electric field from affecting the display effect. In addition, the second polarizer 32 is the reflective polarizer such as the WGP. The second polarizer 32 has to withstand high temperature in the process of bonding the third substrate with the fourth substrate; thus, by forming the second polarizer 32 with metal material, it is avoided the problem that the polarizer made of organic material cannot withstand high temperature and the polarizer is damaged. In this case, because the second polarizer 32 is the reflective polarizer, the light entering the light control panel 2 has been reflected multiple times by the second polarizer 32, thereby improving the light transmittance of the display device 100. By performing experiments, it is found that: the light transmittance of the light control panel 2 reaches more than 30% under the condition that the second polarizer is the reflective polarizer, and the light transmittance is lower than 30% under the condition that the second polarizer is a non-reflective polarizer. The higher the light transmittance of the light control panel 2 is, the higher the light transmittance of the entire display device 100 is.

In FIG. 3C, the materials of the first organic protective layer 510, the first inorganic protective layer 410, the second inorganic protective layer 420, and the second organic protective layer 520 provided on the fourth substrate are respectively the same as the materials of the first organic protective layer 51, the first inorganic protective layer 41, the second inorganic protective layer 42, and the second organic protective layer 52 of the second substrate, please refer to the description of the display device as shown in FIG. 3A.

Other features of the display device 100 in FIG. 3C are the same as the corresponding features of the display device 100 in FIG. 3A, please refer to the previous description.

Figure 3D:
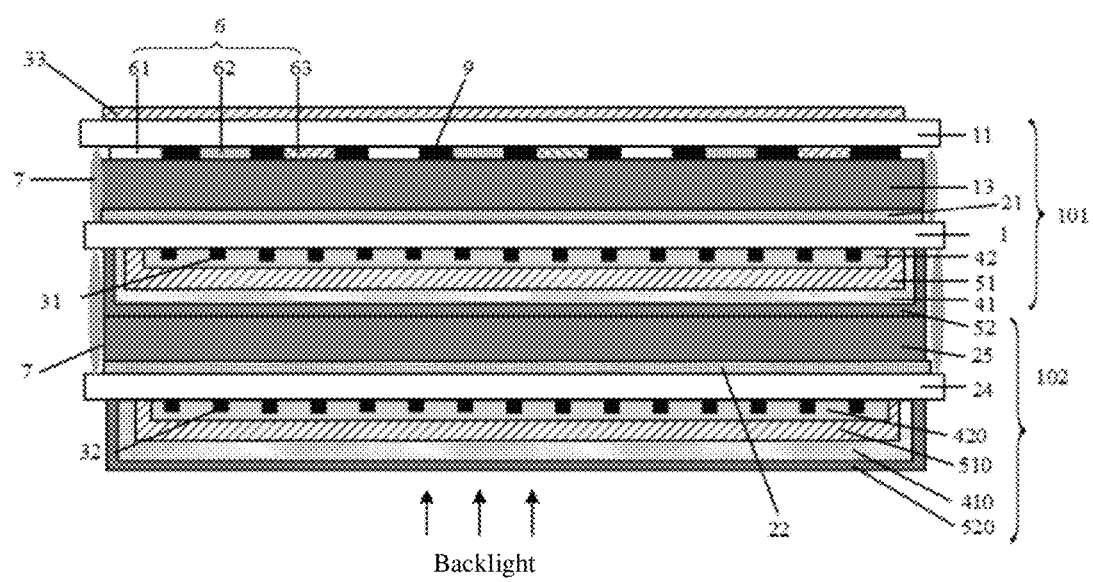
FIG. 3D is still another schematic structural diagram of the display device provided by at least one embodiment of the present disclosure.

FIG. 3D is still another schematic structural diagram of the display device provided by at least one embodiment of the present disclosure. The display device as shown in FIG. 3D has the following differences from the display device as shown in FIG. 3C. The display device 100 includes three substrates, and the three substrate are a first substrate (including the base substrate 11), a second substrate (including the base substrate 24), and a common substrate (including a base substrate 1), respectively. The common substrate is located between the first substrate and the second substrate. The liquid crystal display panel 101 and the light control panel 102 share the common substrate. The liquid crystal display panel 101 includes the first substrate and the common substrate, and the display liquid crystal layer 13 is located between the first substrate and the common substrate. The light control panel 102 includes the second substrate and the common substrate, and the light control liquid crystal layer 25 is located between the second substrate and the common substrate. The common substrate is the array substrate 10 provided by the embodiments of the present disclosure, and the polarizer of the array substrate 10 is the first polarizer 31 and is located on the side of the base substrate 1 of the common substrate facing away from the display liquid crystal layer 13. For example, the first polarizer 31 is the reflective polarizer, such as the WGP, and the reflective polarizer is made of metal material; in this case, the first polarizer 31 is located on a side of the base substrate 1 of the common substrate facing away from the display liquid crystal layer 13, so as to prevent the interference electric field from being generated between the first polarizer 31 made of metal material and the display active elements 21, thereby preventing the interference electric field from affecting the display effect. In addition, the first polarizer 31 has to withstand high temperature in the process of bonding the common substrate with the first substrate; thus, by forming the first polarizer 31 with metal material, it is avoided the problem that the polarizer made of organic material cannot withstand high temperature and the polarizer is damaged.

For example, as shown in FIG. 3D, the second substrate is also the array substrate 10 provided by the embodiment of the present disclosure, and the polarizer of the array substrate 10 is the second polarizer 32 and is located on a side of the base substrate 24 of the second substrate facing away from the light control liquid crystal layer 25. For example, in other embodiments that the display device includes three substrates, the second substrate may not be the array substrate provided by the embodiments of the present disclosure.

Other features and technical effects of the display device as shown in FIG. 3D are the same as the corresponding features and technical effects of the display device as in FIG. 3C, please refer to the previous description.

It should be noted that, in the display device 100 provided in the above embodiments, the first substrate is not the array substrate 10 provided in the embodiments of the present disclosure for the following reasons: if the third polarizer 33 is the above mentioned transmissive polarizer (mainly made of organic material), the third polarizer 33 cannot withstand the high temperature during the bonding process of the first substrate including the third polarizer and the second substrate including the plurality of active elements; if the third polarizer 33 is the reflective polarizer, the reflective polarizer cannot be arranged on the side of the base substrate 11 of the first substrate facing away from the display liquid crystal layer 13 because of strong reflection effect of the third polarizer 33 to the environment light, which seriously interferes with the display.

The display device 100 provided by the embodiments of the present disclosure is, for example, realized as any product or component with display function such as mobile phone, tablet computer, monitor, notebook computer, ATM machine, etc. The display device 100 controls the direction or intensity of the backlight incident on the liquid crystal display panel 101 and has a high light transmittance.

At least one embodiment of the disclosure provides a manufacturing method of an array substrate, and the manufacturing method includes: providing a base substrate; forming a polarizer on a first side of the base substrate; forming a first organic protective layer on a side of the polarizer facing away from the base substrate, in which the first organic protective layer covers the polarizer; forming a first inorganic protective layer, in which the first inorganic protective layer is located on a side of the first organic protective layer facing away from the polarizer and covers the first organic protective layer; and after forming the polarizer, the first organic protective layer and the first inorganic protective layer, forming a plurality of active elements arranged in an array form on a second side of the base substrate opposite to the first side.

Figure 4A:
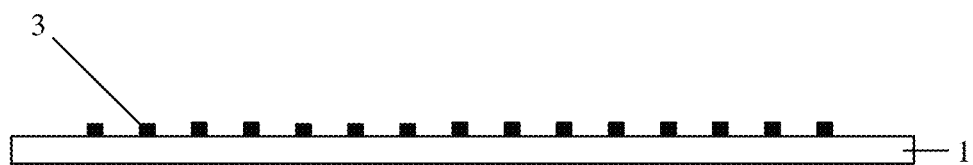
FIG. 4A-FIG. 4E are schematic diagrams of a manufacturing method of an array substrate provided by at least one embodiment of the present disclosure.

Exemplarily, FIG. 4A-FIG. 4E are schematic diagrams of the manufacturing method of the array substrate provided by at least one embodiment of the present disclosure. As shown in FIG. 4A, a base substrate 1 is provided. The base substrate 1 for example is a glass substrate, a quartz substrate, etc. The base substrate 1 for example is a flexible substrate, such as a polyimide substrate, for manufacturing a flexible array substrate, and the flexible array substrate for example is used for forming a flexible display panel. A polarizer 3 is formed on a first side of the base substrate 1. For example, the polarizer 3 is a reflective polarizer as described in the previous embodiments. Of course, in other embodiments, the polarizer 3 may be a transmissive polarizer; and the method is described by taking the reflective polarizer as an example.

Figure 4B:
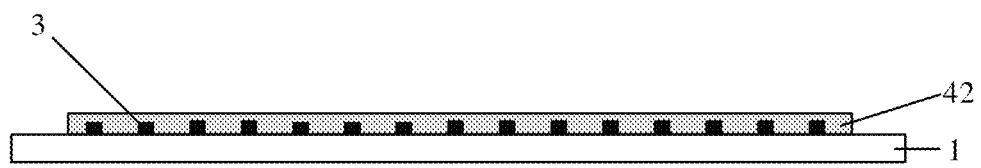

As shown in FIG. 4B, before forming a first organic protective layer, a second inorganic protective layer 42 is formed on the side of the polarizer 3 facing away from the base substrate 1. The second inorganic protective layer 42 is in contact with the polarizer 3. For example, the second inorganic protective layer 42 is formed by a deposition method. The functions and effects of forming the second inorganic protective layer 42 refer to the previous description, and will not be repeated here.

Figure 4C:
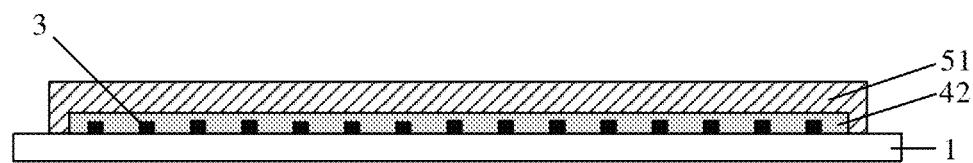

As shown in FIG. 4C, the first organic protective layer 51 is formed on the side of the second inorganic protective layer 42 facing away from the base substrate 1. The first organic protective layer 51 covers the polarizer 3 and the second inorganic protective layer 42. The second inorganic protective layer 42 is located on the side of the first organic protective layer 51 close to the polarizer. For example, the material of the first organic protective layer 51 is a first resin material, such as polyimide (PI). Polyimide has good elasticity and is suitable for obtaining the required thickness. For example, the thickness of the first organic protective layer 51 in the direction perpendicular to the base substrate 1 is 5 μm-10 μm, so that the first organic protective layer 51 plays a better buffer role without significantly increasing the thickness of the array substrate 10, and thus the thickness of the device (such as a display panel) comprising the array substrate 10 is not too large.

Figure 4D:
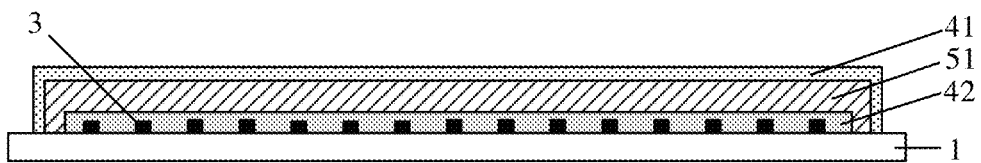

As shown in FIG. 4D, a first inorganic protective layer 41 is formed. The first inorganic protective layer 41 is located on a side of the first organic protective layer 51 facing away from the polarizer 3 and covers the first organic protective layer 51. The water absorption rate of the first inorganic protective layer 41 is less than or equal to the water absorption rate of the second inorganic protective layer 42. Before forming the plurality of active elements, the first side and the second side of the base substrate 1 have to be washed for example with water such as distilled water or deionized water, so as to clean the first side and the second side of the base substrate 1 and create a clean surface for forming the plurality of active elements on the base substrate 1. Because the water absorption rate of the first inorganic protective layer 41 is less than or equal to the water absorption rate of the second inorganic protective layer 42, the first inorganic protective layer 41 plays a good waterproof role and prevent water vapor from entering the first organic protective layer 51 and the polarizer 3.

For example, the material of the first inorganic protective layer 41 is silicon nitride, and the material of the second inorganic protective layer 42 includes one or more selected from the group consisting of silicon oxide, silicon nitride, or silicon oxynitride. Compared with other inorganic materials adopted in the array substrates such as the array substrate in the display field, the silicon nitride is easy to be formed and has lower water absorption rate, and the water absorption rate of the silicon nitride is lower than other inorganic materials such as silicon oxide and silicon oxynitride. Of course, the materials of the first inorganic protective layer 41 and the second inorganic protective layer 42 are not limited to those listed above.

Figure 4E:
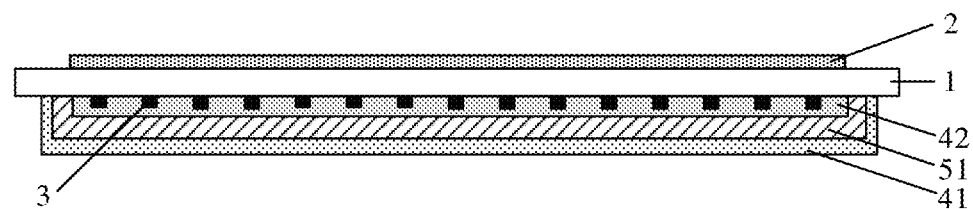

As shown in FIG. 4E, after forming the polarizer 3, the second inorganic protective layer 42, the first organic protective layer 51 and the first inorganic protective layer 41, the plurality of active elements 2 are formed in array form on the second side of the substrate base 1 opposite to the first side, thereby obtaining the array substrate 10 as shown in FIG. 4E. The array substrate 10 for example is a display array substrate, for example, the array substrate 10 is used in the display panel or the display device. For example, the array substrate 10 is a light control array substrate for playing a light dimming role. The plurality of active elements 2 include, for example, thin film transistors (TFTs) and other elements for driving and controlling the display state of the display panel or the display device comprising the array substrate 10. As for the specific structure of the plurality of active elements 2, those skilled in the art may adopt a conventional design.

Figure 5A:
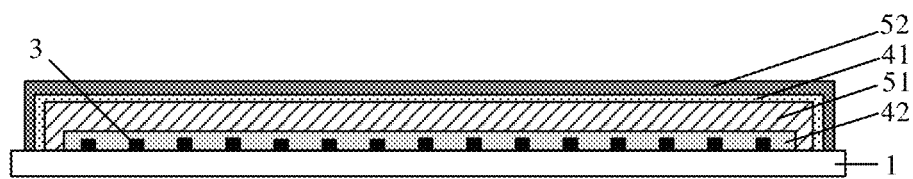
FIG. 5A-FIG. 5B are another schematic diagrams of the manufacturing method of the array substrate provided by at least one embodiment of the present disclosure.
Figure 5B:
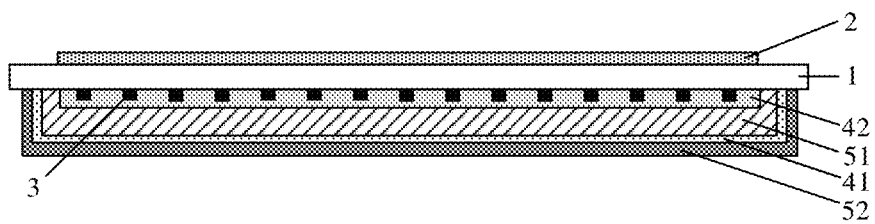

FIG. 5A-FIG. 5B are another schematic diagrams of the manufacturing method of the display panel provided by at least one embodiment of the present disclosure. As shown in FIG. 5A, after the manufacturing steps as shown in FIG. 4A-FIG. 4D, a second organic protective layer 52 is formed on a side of the first inorganic protective layer 41 facing away from the base substrate 1. The roughness of the surface of the second organic protective layer 52 facing away from the polarizer 3 is greater than the roughness of the surface of the first inorganic protective layer 41 facing away from the polarizer 3.

As shown in FIG. 5B, after forming the second organic protective layer 52, the plurality of active elements 2 are formed on the second side of the base substrate 1. For example, in the process of forming the plurality of active elements 2, the base substrate 1 is arranged in a semiconductor processing equipment in which a grasping device is arranged, and the grasping device is configured to grasp and fix the base substrate 1 and contact with the surface of the second organic protective layer 52 facing away from the base substrate 1. The surface of the second organic protective layer 52 facing away from the polarizer 3 has higher roughness, which is beneficial to increase the static friction coefficient of the surface of the second organic protective layer 52 facing away from the polarizer 3, thereby increasing the static friction between the surface of the second organic protective layer 52 facing away from the polarizer 3 and the grasping device, preventing the substrate from falling off, and improving the yield and production efficiency.

For example, the material of the first organic protective layer 51 is a first resin material, and the material of the second organic protective layer 52 is a second resin material. The elastic modulus of the first resin material is smaller than the elastic modulus of the second resin, so that the first organic protective layer 51 closer to the polarizer 3 has relatively greater elasticity, thus plays a better buffering role and better protects the polarizer 3. Furthermore, the roughness of the surface of the second organic protective layer 52 facing away from the polarizer 3 is greater than the roughness of the first organic protective layer 51 facing away from the polarizer 3, that is, in the direction perpendicular to the substrate 1, the second organic protective layer 52 is farthest from the polarizer 3, and the roughness of the surface of the second organic protective layer 52 facing away from the polarizer 3 is maximum, so as to prevent the substrate from falling off from the grasping device in the above mentioned deposition equipment (such as the semiconductor processing equipment).

For example, the material of the second organic protective layer 52 is acrylic or epoxy resin. After testing, it is concluded that, due to the properties of these materials themselves, the friction between the surface of the layer formed with these materials by a coating method and other objects such as the grasping device is larger compared with the case that the second organic protective layer 52 is formed by other materials, which is beneficial to prevent the base substrate from falling off from the grasping device in the above mentioned deposition equipment.

For the technical effects not mentioned in the manufacturing method, please refer to the corresponding descriptions of the array substrate.

The foregoing embodiments merely are exemplary embodiments of the disclosure, and not intended to define the scope of the disclosure, and the scope of the disclosure is determined by the appended claims.

What is claimed is:

1. An array substrate, comprising:
a base substrate;
a polarizer, located on a first side of the base substrate;
a plurality of active elements, arranged in an array form and provided on a second side of the base substrate opposite to the first side;
a first organic protective layer, located on a side of the polarizer facing away from the base substrate and covering the polarizer;
a first inorganic protective layer, located on a side of the first organic protective layer facing away from the polarizer and covering the first organic protective layer; and
a second organic protective layer, located on a side of the first inorganic protective layer facing away from the polarizer and covering a surface of the first inorganic protective layer facing away from the polarizer, wherein a roughness of a surface of the second organic protective layer facing away from the polarizer is greater than a roughness of the surface of the first inorganic protective layer facing away from the polarizer; and
a second inorganic protective layer located on a side of the first organic protective layer near the polarizer and in contact with the polarizer, wherein a water absorption rate of the first inorganic protective layer is smaller than or equal to a water absorption rate of the second inorganic protective layer,
wherein, in a direction perpendicular to the base substrate, the second inorganic protective layer, the first organic protective layer, the first inorganic protective layer, and the second organic protective layer are sequentially arranged away from the polarizer, and the second organic protective layer is a layer farthest away from the polarizer and has a roughness larger than each roughness of all other layers covering the polarizer on the first side of the base substrate.

2. The array substrate according to claim 1, wherein
a material of the first organic protective layer is a first resin material, and a material of the second organic protective layer is a second resin material; and
an elastic modulus of the first resin material is smaller than an elastic modulus of the second resin material, and the roughness of the surface of the second organic protective layer facing away from the polarizer is greater than a roughness of a surface of the first organic protective layer facing away from the polarizer.

3. The array substrate according to claim 2, wherein a material of the first organic protective layer is polyimide, and a material of the second organic protective layer is acrylic or epoxy resin.

4. The array substrate according to claim 1, wherein a thickness of the first organic protective layer in a direction perpendicular to the base substrate is greater than a thickness of the second organic protective layer in a direction perpendicular to the base substrate.

5. The array substrate according to claim 4, wherein the thickness of the first organic protective layer in the direction perpendicular to the base substrate is 3 to 5 times of the thickness of the second organic protective layer in the direction perpendicular to the base substrate.

6. The array substrate according to claim 1, wherein a material of the first inorganic protective layer is silicon nitride, and a material of the second inorganic protective layer comprises one or more selected from the group consisting of silicon oxide, silicon nitride, and silicon oxynitride.

7. The array substrate according to claim 1, wherein the polarizer is a reflective polarizer.

8. The array substrate according to claim 7, wherein the reflective polarizer is a wire-grid polarizer (WGP).

9. A display device, comprising:
an array substrate, wherein the array substrate comprises:
a base substrate;
a polarizer, located on a first side of the base substrate;
a plurality of active elements, arranged in an array form and provided on a second side of the base substrate opposite to the first side;
a first organic protective layer, located on a side of the polarizer facing away from the base substrate and covering the polarizer;
a first inorganic protective layer, located on a side of the first organic protective layer facing away from the polarizer and covering the first organic protective layer; and
a second organic protective layer, located on a side of the first inorganic protective layer facing away from the polarizer and covering a surface of the first inorganic protective layer facing away from the polarizer, wherein a roughness of a surface of the second organic protective layer facing away from the polarizer is greater than a roughness of the surface of the first inorganic protective layer facing away from the polarizer; and
a second inorganic protective layer located on a side of the first organic protective layer near the polarizer and in contact with the polarizer, wherein a water absorption rate of the first inorganic protective layer is smaller than or equal to a water absorption rate of the second inorganic protective layer,
wherein, in a direction perpendicular to the base substrate, the second inorganic protective layer, the first organic protective layer, the first inorganic protective layer, and the second organic protective layer are sequentially arranged away from the polarizer, and the second organic protective layer is a layer farthest away from the polarizer and has a roughness larger than each roughness of all other layers covering the polarizer on the first side of the base substrate.

10. The display device according to claim 9, further comprising:
a liquid crystal display panel and a light control panel which are stacked, wherein the liquid crystal display panel comprises a display liquid crystal layer, and the light control panel comprises a light control liquid crystal layer;
a first polarizer, located between the display liquid crystal layer and the light control liquid crystal layer;
a second polarizer, wherein the light control liquid crystal layer is located between the first polarizer and the second polarizer; and
a third polarizer, wherein the first polarizer is located between the second polarizer and the third polarizer, and the display liquid crystal layer is located between the first polarizer and the third polarizer, wherein
the first polarizer, the second polarizer, and the third polarizer are configured so that a backlight sequentially passes through the second polarizer, the first polarizer, and the third polarizer; and
the polarizer of the array substrate serves as at least one of the first polarizer and the second polarizer.

11. The display device according to claim 10, wherein
the liquid crystal display panel comprises a first substrate and a second substrate which are opposite to each other, and the display liquid crystal layer is located between the first substrate and the second substrate;
the light control panel comprises a third substrate and a fourth substrate which are opposite to each other, the light control liquid crystal layer is located between the third substrate and the fourth substrate, and the second substrate and the third substrate are located between the first substrate and the fourth substrate; and
the second substrate is the array substrate, and the polarizer of the array substrate is the first polarizer and is located on a side of a base substrate of the second substrate facing away from the display liquid crystal layer; or the third substrate is the array substrate, and the polarizer of the array substrate is the first polarizer and is located on a side of a base substrate of the third substrate close to the display liquid crystal layer.

12. The display device according to claim 10, further comprising:
a first substrate;
a second substrate, opposite to the first substrate; and
a common substrate, located between the first substrate and the second substrate, wherein
the liquid crystal display panel and the light control panel share the common substrate, the liquid crystal display panel comprises the first substrate and the common substrate, and the display liquid crystal layer is located between the first substrate and the common substrate;
the light control panel comprises the second substrate and the common substrate, and the light control liquid crystal layer is located between the second substrate and the common substrate; and
the common substrate is the array substrate, and the polarizer of the array substrate is the first polarizer and is located on a side of a base substrate of the common substrate facing away from the display liquid crystal layer.

13. The display device according to claim 11, wherein the fourth substrate is the array substrate, and the polarizer of the array substrate is the second polarizer and is located on a side of a base substrate of the fourth substrate facing away from the light control liquid crystal layer.

14. The display device according to claim 12, wherein the second substrate is the array substrate, and the polarizer of the array substrate is the second polarizer and is located on a side of a base substrate of the second substrate facing away from the light control liquid crystal layer.

15. A manufacturing method of an array substrate, comprising:
providing a base substrate;
forming a polarizer on a first side of the base substrate;
forming a first organic protective layer on a side of the polarizer facing away from the base substrate, wherein the first organic protective layer covers the polarizer;
forming a first inorganic protective layer, wherein the first inorganic protective layer is located on a side of the first organic protective layer facing away from the polarizer and covers the first organic protective layer;

after forming the polarizer, the first organic protective layer and the first inorganic protective layer, forming a plurality of active elements arranged in an array form on a second side of the base substrate opposite to the first side; and forming a second organic protective layer on a side of the first inorganic protective layer facing away from the base substrate, wherein a roughness of a surface of the second organic protective layer facing away from the polarizer is greater than a roughness of a surface of the first inorganic protective layer facing away from the polarizer; and before forming the first organic protective layer, forming a second inorganic protective layer located on a side of the first organic protective layer near the polarizer and in contact with the polarizer, wherein a water absorption rate of the first inorganic protective layer is smaller than or equal to a water absorption rate of the second inorganic protective layer, wherein, in a direction perpendicular to the base substrate, the second inorganic protective layer, the first organic protective layer, the first inorganic protective layer, and the second organic protective layer are sequentially formed away from the polarizer, and the second organic protective layer is a layer farthest away from the polarizer and has a roughness larger than each roughness of all other layers covering the polarizer on the first side of the base substrate.

16. The manufacturing method according to claim 15, wherein a material of the first inorganic protective layer is silicon nitride, and a material of the second inorganic protective layer comprises one or more selected from the group consisting of silicon oxide, silicon nitride or silicon oxynitride.

\* \* \* \* \*